(12) United States Patent
Mayle et al.

(10) Patent No.: US 6,620,271 B2
(45) Date of Patent: Sep. 16, 2003

(54) OPEN DIE SYSTEM

(76) Inventors: Steven R. Mayle, 2274 Augusta Dr., Fremont, OH (US) 43420; Robert L. Mayle, 2047 S. Hyde Rd., Port Clinton, OH (US) 43452

( * ) Notice: Subject to any disclaimer, the term of this patent is extended or adjusted under 35 U.S.C. 154(b) by 208 days.

(21) Appl. No.: 09/901,247

(22) Filed: Jul. 9, 2001

(65) Prior Publication Data

US 2003/0006002 A1 Jan. 9, 2003

(51) Int. Cl.[7] .............................................. B29C 65/00
(52) U.S. Cl. ................ 156/73.5; 156/274.4; 156/275.1; 156/308.4; 156/380.4; 156/380.6; 52/58; 285/42; 425/500; 425/392
(58) Field of Search ................... 156/71, 73.5, 274.11, 156/275.1, 308.2, 308.4, 380.4, 380.5, 380.6; 52/58, 198, 219; 285/42, 43, 44; 425/500, 392

(56) References Cited

U.S. PATENT DOCUMENTS

| | | | | |
|---|---|---|---|---|
| 322,153 A | 7/1885 | Blair et al. | ..................... | 52/540 |
| 549,352 A | 11/1895 | Folger | ......................... | 285/43 |
| 821,426 A | 5/1906 | Meyer | ......................... | 24/280 |
| 835,889 A | 11/1906 | Moeller | ....................... | 52/521 |
| 1,012,219 A | 12/1911 | Overton | ....................... | 285/44 |
| 1,031,577 A | 7/1912 | Overton | ....................... | 285/44 |
| 1,080,159 A | 12/1913 | Overton | ....................... | 285/43 |
| 1,103,666 A | 7/1914 | Fife | ........................... | 285/13 |
| 1,163,034 A | 12/1915 | Phippen | ....................... | 52/551 |
| 1,195,338 A | 8/1916 | Churchill | ..................... | 285/44 |
| 1,202,687 A | 10/1916 | Elkerton | ...................... | 285/13 |
| 1,540,192 A | 6/1925 | Smith | ........................... | 285/13 |
| 1,594,932 A | 8/1926 | Doyle | ......................... | 285/43 |
| 1,678,715 A | 7/1928 | Stephenson | .................. | 285/44 |
| 1,721,715 A | 7/1929 | Schindler | .................... | 285/43 |
| 1,923,220 A | 8/1933 | Lightbown | .................... | 285/13 |
| 2,069,289 A | 2/1937 | Swendsen et al. | ......... | 52/288.1 |
| 2,151,794 A | 3/1939 | Peebles | ....................... | 52/540 |

(List continued on next page.)

FOREIGN PATENT DOCUMENTS

| | | |
|---|---|---|
| CH | 221530 | 6/1942 |
| DE | 3321101 | 12/1983 |
| GB | 1 310 003 | 1/1971 |
| GB | 1 355 517 | 5/1971 |
| GB | 1 511 729 | 10/1975 |
| JP | 49-002675 | 1/1974 |

OTHER PUBLICATIONS

Alkor Single Ply Roofing Systems brochure.
At Last Roofing, Inc. catalog, 1986.
Benoit E.P.D.M. Roofing Systems brochure, 1983.
Bond Cote Roofing Systems detail drawings, Jul. 1988, pp. 7–5.1, 7–6, 7–6.1, 7–9.
Custom Seal detail drawings, pp. #1–#41.
Duro–Last detail drawings, Jun. 1983, pp. 7.10, 7.11.
Duro–Last Roofing, Inc. The Complete Roofing System.
Duro–Last Roofing, Inc. Factory Mutual Systems manual, mid–1980's.

(List continued on next page.)

*Primary Examiner*—Michael W. Ball
*Assistant Examiner*—John T. Haran
(74) *Attorney, Agent, or Firm*—Standley & Gilcrest LLP

(57) ABSTRACT

A die system for use in formation of a welded flashing, comprising a body portion comprised of a conducting material, the body portion having a first end and a second end; an indent portion at the first end of said body portion adapted to accept a portion of the flashing during welding; and where the portion of the flashing accepted in the indent portion of the body portion is folded away from an operational connection between the first end of the body portion and a welder during welding.

14 Claims, 11 Drawing Sheets

U.S. PATENT DOCUMENTS

| | | | | |
|---|---|---|---|---|
| 2,176,344 A | 10/1939 | Hunt | | 52/548 |
| 2,256,313 A | 9/1941 | Dexter | | 52/548 |
| 3,040,154 A | 6/1962 | Marsh | | 156/539 |
| 3,054,222 A | 9/1962 | Buckneer | | 52/543 |
| 3,325,953 A | 6/1967 | Alleaume | | 52/276 |
| 3,446,685 A | 5/1969 | Golstone et al. | | 156/219 |
| 3,446,688 A | 5/1969 | Flax | | 156/423 |
| 3,451,178 A | 6/1969 | Beale | | 52/210 |
| 3,566,562 A | 3/1971 | White | | |
| 3,763,605 A | 10/1973 | Freeman | | 52/58 |
| 3,871,145 A | 3/1975 | Hatmaker | | 52/60 |
| 3,887,323 A | 6/1975 | Bratten | | 425/521 |
| 3,890,754 A | 6/1975 | Spurdle | | 52/631 |
| 3,894,376 A | 7/1975 | Shearer | | 52/518 |
| 3,942,295 A | 3/1976 | Schacht | | 52/288 |
| 4,049,034 A | 9/1977 | Vcelka et al. | | 150/8 |
| 4,112,632 A | 9/1978 | Simpson | | 52/11 |
| 4,115,961 A | 9/1978 | Bishop | | 52/58 |
| 4,120,129 A | 10/1978 | Nagler et al. | | 52/219 |
| 4,162,597 A | 7/1979 | Kelly | | 52/410 |
| 4,192,116 A | 3/1980 | Kelly | | 52/469 |
| 4,217,742 A | 8/1980 | Evans | | 52/553 |
| 4,223,786 A | 9/1980 | Hori | | 52/1 |
| 4,226,069 A | 10/1980 | Hinds | | 52/521 |
| 4,265,058 A | 5/1981 | Logsdon | | 52/58 |
| 4,302,275 A | 11/1981 | Burmeister et al. | | 156/446 |
| 4,335,546 A | 6/1982 | Kelly | | 52/58 |
| 4,351,140 A | 9/1982 | Simpson | | 52/410 |
| 4,374,695 A | 2/1983 | Ikeda et al. | | 156/293 |
| 4,382,353 A | 5/1983 | Kelly | | 52/506 |
| 4,386,488 A | 6/1983 | Gibbs | | 52/199 |
| 4,389,826 A | 6/1983 | Kelly | | 52/410 |
| 4,419,067 A | 12/1983 | Graafmann | | 425/392 |
| 4,441,295 A | 4/1984 | Kelly | | 52/408 |
| 4,446,665 A | 5/1984 | Berger | | 52/407 |
| 4,449,336 A | 5/1984 | Kelly | | 52/105 |
| 4,493,175 A | 1/1985 | Coppola, Jr. | | 52/410 |
| 4,496,410 A | 1/1985 | Davis et al. | | 156/84 |
| 4,544,593 A | 10/1985 | Borgert et al. | | 428/80 |
| 4,555,296 A | 11/1985 | Burtch et al. | | 156/446 |
| 4,557,081 A | 12/1985 | Kelly | | 52/94 |
| 4,603,517 A | 8/1986 | Lyons, Jr. | | 52/60 |
| 4,625,469 A | 12/1986 | Gentry et al. | | 52/3 |
| 4,635,409 A | 1/1987 | Vandemore | | 52/60 |
| 4,642,950 A | 2/1987 | Kelly | | 52/90 |
| 4,652,321 A | 3/1987 | Greko | | 156/165 |
| 4,668,315 A | 5/1987 | Brady et al. | | 156/71 |
| 4,671,036 A | 6/1987 | Sullivan | | 52/518 |
| 4,688,361 A | 8/1987 | Kelly | | 52/173 R |
| 4,700,512 A | 10/1987 | Laska | | 52/58 |
| 4,712,348 A | 12/1987 | Triplett et al. | | 52/408 |
| 4,718,211 A | 1/1988 | Russell et al. | | 52/409 |
| 4,726,164 A | 2/1988 | Reinwall et al. | | 52/410 |
| 4,736,562 A | 4/1988 | Kelly | | 52/173 R |
| 4,799,986 A | 1/1989 | Janni | | 156/196 |
| 4,834,828 A | 5/1989 | Murphy | | 156/359 |
| 4,848,045 A | 7/1989 | Nichols et al. | | 52/60 |
| 4,860,514 A | 8/1989 | Kelly | | 52/410 |
| 4,870,796 A | 10/1989 | Hart et al. | | 52/409 |
| 4,872,296 A | 10/1989 | Janni | | 52/58 |
| 4,888,930 A | 12/1989 | Kelly | | 52/410 |
| 4,909,135 A | 3/1990 | Greko | | 454/368 |
| 4,947,614 A | 8/1990 | Mayle | | 52/717.1 |
| 4,963,219 A | 10/1990 | Nichols et al. | | |
| 5,014,486 A | 5/1991 | Mayle | | 52/717.1 |
| 5,027,572 A | 7/1991 | Purcell et al. | | 52/309.9 |
| 5,031,374 A | 7/1991 | Batch et al. | | 52/410 |
| 5,065,553 A | 11/1991 | Magid | | 52/58 |
| 5,077,943 A | 1/1992 | McGady | | 52/58 |
| 5,145,617 A | 9/1992 | Hermanson et al. | | 264/143 |
| 5,197,252 A | 3/1993 | Tiscareno | | 52/553 |
| 5,218,793 A | 6/1993 | Ball | | 52/62 |
| 5,365,709 A | 11/1994 | Lassiter | | 52/408 |
| 5,452,553 A | 9/1995 | Clapp et al. | | 52/408 |
| 5,570,553 A | 11/1996 | Balkins | | 52/518 |
| 5,586,414 A | 12/1996 | Tawzer | | 52/57 |
| 5,605,019 A | 2/1997 | Maziekien et al. | | 52/58 |
| 5,706,610 A | 1/1998 | Mayle | | 52/60 |
| 5,740,647 A | 4/1998 | Kelly | | 52/408 |
| 5,775,052 A | 7/1998 | Mayle | | 52/746.11 |
| 5,829,214 A | 11/1998 | Hart | | |
| 5,850,719 A | 12/1998 | Mayle | | 52/408 |
| 5,930,969 A | 8/1999 | Mayle et al. | | 52/545 |
| 5,935,357 A | 8/1999 | Hubbard et al. | | 156/82 |
| 5,983,592 A | 11/1999 | Mayle | | 52/746.11 |
| 6,004,645 A | 12/1999 | Hubbard | | 428/57 |
| 6,021,616 A | 2/2000 | Mayle | | 52/408 |
| 6,110,311 A | 8/2000 | Mayle et al. | | 156/189 |
| 6,187,122 B1 | 2/2001 | Hubbard et al. | | 156/82 |
| 6,199,326 B1 | 3/2001 | Mayle | | 52/58 |
| 6,205,730 B1 | 3/2001 | Hasan et al. | | 52/408 |
| 6,250,034 B1 | 6/2001 | Hulsey | | 52/410 |

OTHER PUBLICATIONS

Duro–Last Roofing, Inc. information manual, 1991–1994.
Duro–Last Roofing, Inc. information manual.
Duro–Last Roofing, Inc. manual, Jan. 1992.
GAF Roofing Products brochure, 1983.
GenFlex Roofing Systems detail drawings, 1994.
General Tire All Climate Roofing Systems brochure, 1982.
General Tire Building and Products Company, The General Tire and Rubber Company, Field Fabricated Pipe Boot spec sheet, Jun. 1983, pp. F–3.01.
GTR Building and Products Company, The General Tire and Rubber Company, GenSeal ACR Roofing System Roof Pipe Penetration spec sheet.
GTR Building and Products Company, The General Tire and Rubber Company, Prefabricated Pipe Boot spec sheet, Jun. 1984, F–3.03.
I.p.w. Interplastic Interoof Roofing Systems brochure.
Johns–Manville Manual for Built–Up Roof Systems brochure, 1983.
J.P. Stevens Hi–Tuff single–ply membrane roofing brochure.
Koppers The Roofing People brochure.
Mayle, Steve Side evalutional view of Custom Seal's corner piece, Fig. 7.
Mule–Hide Products Co., Inc. detail drawings, MH–112, MH–121.
Owens–Corning Fiberglass PermaPly—R brochure, 1982.
Polyken Roofing Systems brochure.
Rubber and Plastics Company, Inc. Ingle Ply Membrane Roofing brochure.
Sarnafil detail drawings, 5.1–5.3.
Sarnafil Roofing Membranes brochure.
Seal–Dry/USA, Inc. detail drawings, Jun. 1994.
Seaman Corp. Fiberlite Single Ply Roof field fabricated pipe flashing drawing, Oct. 1986, FTR–D19.
Seaman Corp. Fiberlite Single Ply Roof, preformed pipe flashing drawing, Jan. 1996, FTR–DP3.
Siplast brochure.
Tamko Built–Up Roofing Systems brochure, 1983.
Trocal Roofing Systems.
WeatherGuard Single Ply Elastomeric Roofing Systems brochure.

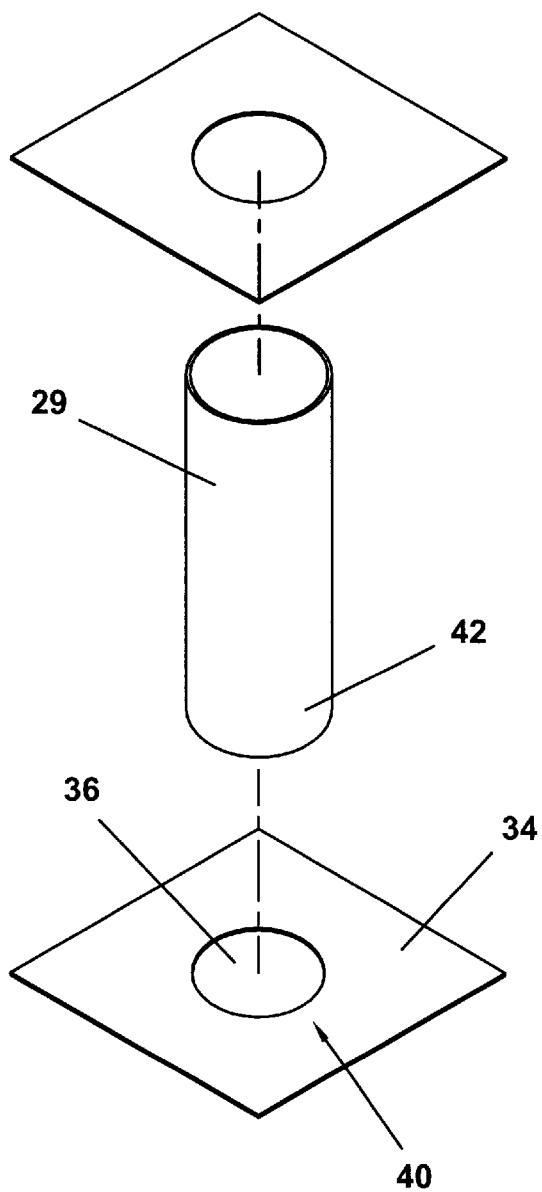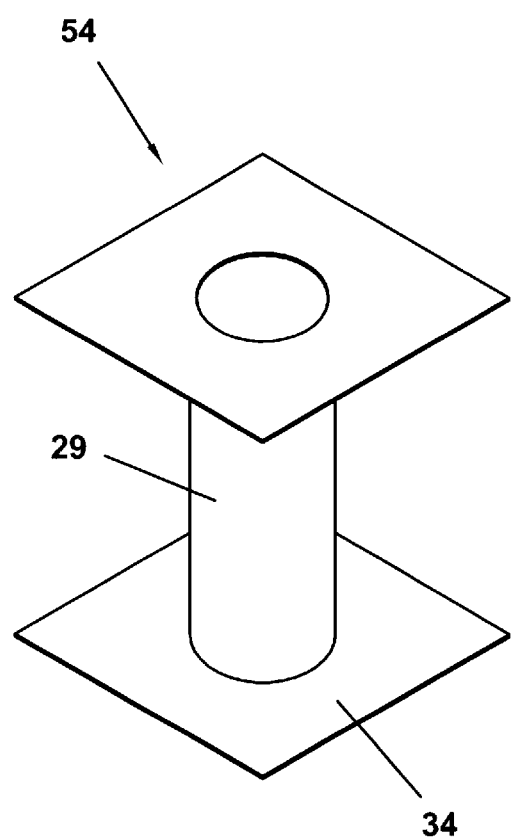
*FIG. 4A*  *FIG. 4B*

OPEN DIE SYSTEM

BACKGROUND AND SUMMARY OF THE INVENTION

The present invention relates to an open die system for making a membrane or other flashing for providing a water-tight seal. More particularly, the open die construction allows the efficient manufacture of flashings.

Polymer coated membranes are commonly used to cover and seal roofs and other building structures. Although these roofs are generally flat, there are frequently items protruding from the surface of the roof, such as vents, ductwork, air conditioning units, and the like. It is known to construct a boot or flashing for covering and sealing a vertical protrusion (e.g., pipe) extending from a roof to be sealed. Flashings may also be used to cover and seal drain outlets, e.g., scuppers, in buildings for draining water. Flashings used to seal these type of outlets are also known as scupper flashings.

In one embodiment, the flashings are manufactured by heat welding membranes of predetermined sizes together to form the finished product. One method of making the flashings involves the use of dies configured to hold the membranes in appropriate positions for welding.

The present invention is a unique open die system that allows the formation of flashings using die portions that are relatively shorter in length than the finished flashing product. The opening in the die piece allows the body portion of the flashing to be folded down into the opening and away from the welder during the welding process. The present invention is a die for use in formation of a heat welded flashing, comprising:

a body portion comprised of a conducting material, the body portion having a first end and a second end; an indent portion at the first end of said body portion adapted to accept a portion of the flashing during welding; and where the portion of the flashing accepted in the indent portion of the body portion is folded away from an operational connection between the first end of the body portion and a welder during welding.

In another embodiment, the die system of the present invention is comprised of an open plate die for mating with a base die portion for welding the flashing. The opening in the open plate die may be changed to produce flashings of various sizes. In this embodiment, a body die portion may also be used on top of the open plate die. The body die portion preferably has indents for receiving a portion of the flashing during welding.

In addition to the features mentioned above, objects and advantages of the present invention will be readily apparent upon a reading of the following description.

BRIEF DESCRIPTION OF THE DRAWINGS

Novel features and advantages of the present invention, in addition to those mentioned above, will become apparent to those skilled in the art from a reading of the following detailed description in conjunction with the accompanying drawings wherein similar reference characters refer to similar parts and in which:

FIGS. 4A–4B illustrate one embodiment of an assembled flashing made according to the die system of the present invention;

DETAILED DESCRIPTION OF PREFERRED EMBODIMENT(S)

The preferred system herein described is not intended to be exhaustive or to limit the invention to the precise forms disclosed. They are chosen and described to explain the principles of the invention, and the application of the method to practical uses, so that others skilled in the art may practice the invention.

Figure 1:
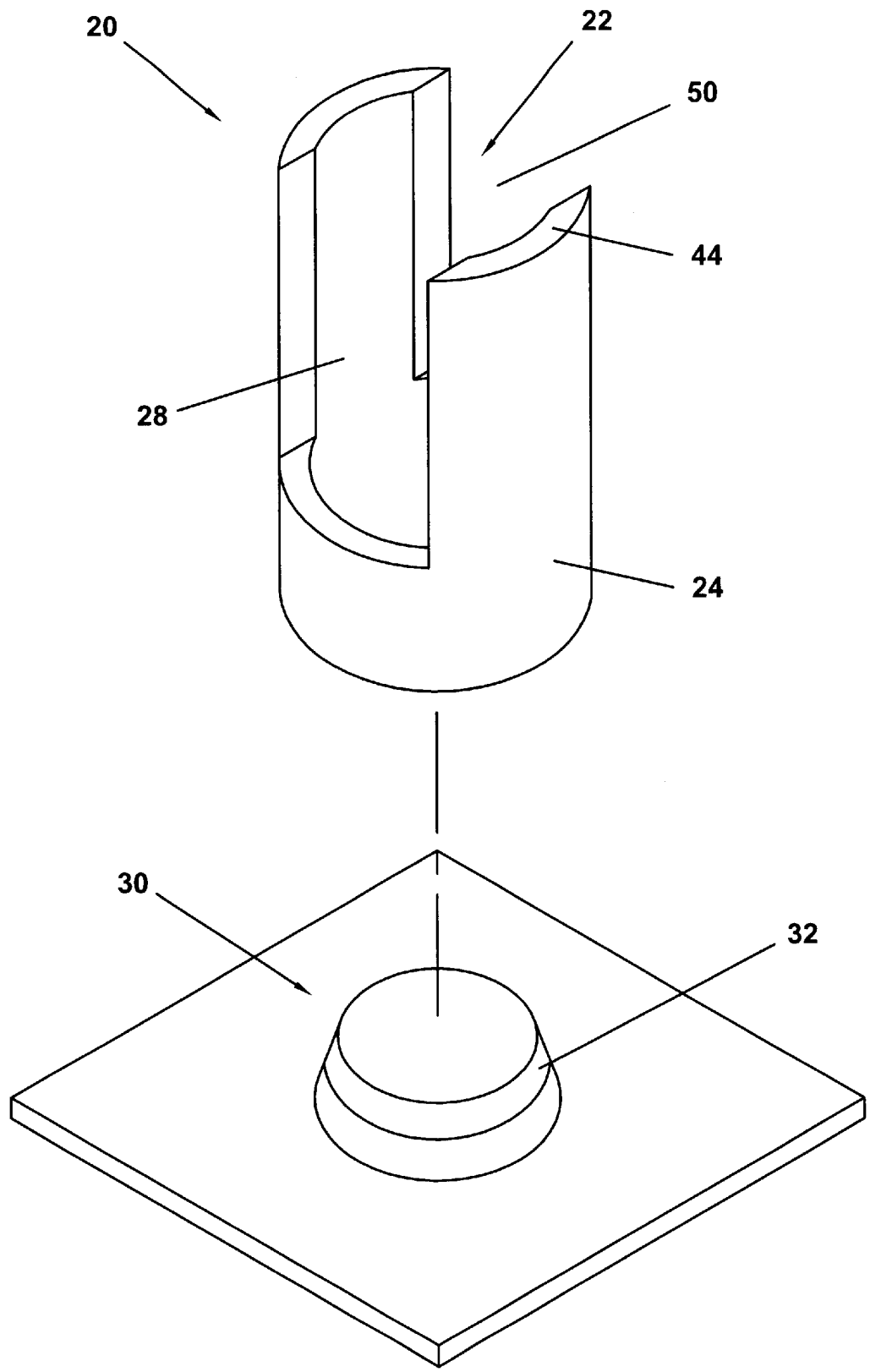
FIG. 1 illustrates an exploded view of one embodiment of the die system of the present invention.
Figure 2A:
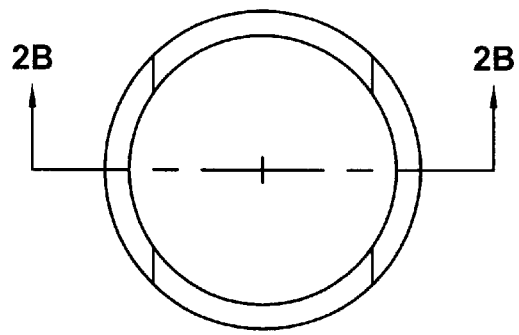
FIGS. 2A–2C illustrate various views of one embodiment of the die body portion of the present invention.
Figure 2B:
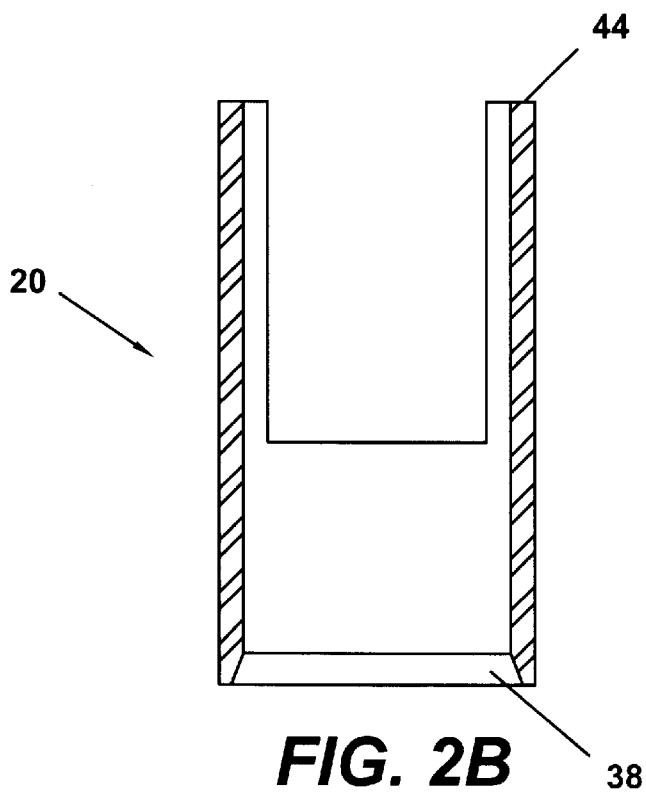
Figure 2C:
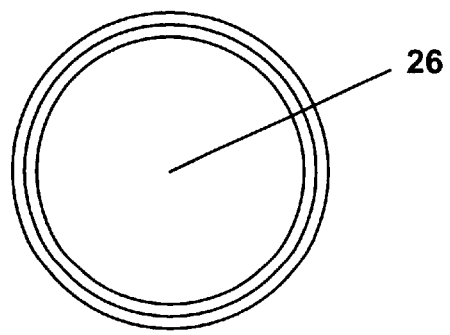
Figure 3A:
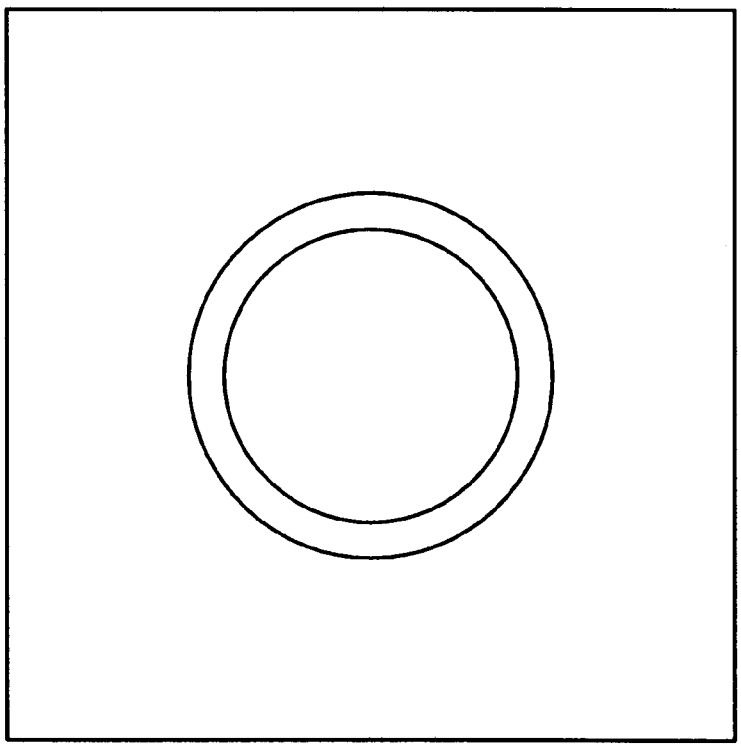
FIGS. 3A–3B illustrate a base die portion of the present invention.
Figure 3B:
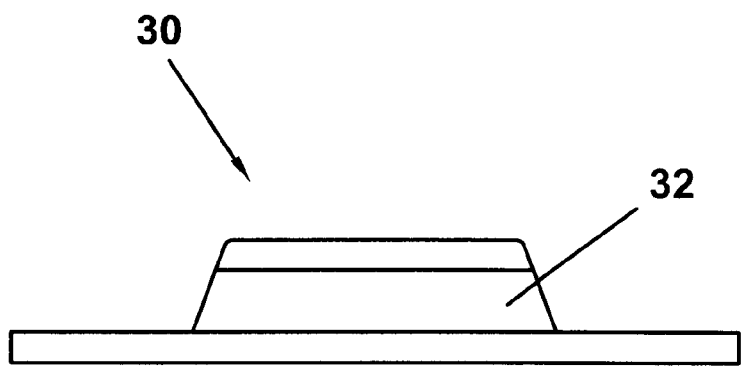

FIG. 1 illustrates an exploded view of one embodiment of the die system of the present invention; FIG. 2A illustrates a top plan view of one embodiment of the die body portion of the present invention; FIG. 2B illustrates a cross-sectional view of one embodiment of the die body portion; FIG. 2C illustrates a bottom plan view of the die body portion; FIG. 3A illustrates a top plan view of one embodiment of the base die portion of the present invention; FIG. 3B illustrates a side elevational view of the base die portion of FIG. 3A.

The die for use in formation of a heat welded flashing is preferably comprised of: a die body portion 20 comprised of a conducting material, the die body portion having a first end 22 and a second end 24; an opening 26 at the second end of the body portion; an indent 28 portion at the first end of the body portion adapted to accept a portion of the flashing during welding; and wherein the portion of the flashing accepted in the indent portion of the body portion is folded away from an operational connection between the first end of the die body portion and a welding machine.

The die body portion is adapted to accept a first flashing portion 29. This first flashing portion or membrane may be a conical or tubular flashing for a pipe or boot flashing, for example. The first flashing portion may be placed in the die body portion from the first or second end. The inside surface 38 of the second end of the die body portion is preferably configured to correspond to the shape of the base die member 30.

In one embodiment, the base die portion has a beveled or sloped edge 32. The base die portion may also be straight. A second flashing portion 34 having a hole 36 corresponding to the size of the base die portion is installed onto the base die portion. This second flashing portion may be a base flashing member for a boot flashing for example. The edge 40 of the second flashing along the hole is engaged to the sloped edge of the base die member. In one embodiment, the hole in the second flashing portion may be slightly smaller in diameter than the base die portion so that the hole may be stretched to accommodate, and to be held taut against, the base die portion.

The body die portion with the first flashing portion is then engaged to the base die portion with the second flashing portion installed thereto. The outside sloped surface of the base die portion is preferably mated to correspond to the inside surface of the body die portion so that the first flashing portion is pressed against the second flashing portion in the desired weld position. More particularly, a bottom edge 42 of the first flashing portion is coupled to the second flashing portion along the hole edge 40 (in one embodiment, along an axial taper in the vertical plane) which is engaged to the base die member during welding.

The base die portion and the body die portion are preferably comprised of a conducting material. With the first and second flashing portions engaged, and held together by the die portions, a welding machine is placed into operational connection to the body die portion. In one embodiment, the welding machine connects to the first end of the die body portion; e.g., the welder covers the top of the first end of the die body portion. This operational connection to the welder is preferably made at the surface edge 44 of the first end of the die body portion. The welder is also operationally connected to the base die portion to complete the circuit. After the welder is operationally connected to the die system, heat is generated around the body die portion and the base die portion which results in a weld or seal/joining between the first and second flashing portions held in contact by the body and base die portions.

Various known methods of heat welding may be used. In one embodiment, a radio frequency welding ("RF welding") or "RF heat sealing" machine may be used. This welding process is also known as high frequency or dielectric heat sealing. RF welding is the process of fusing materials together by applying radio frequency energy to the area to be joined. This method is designed to make use of the heat generated in poor electrical conductors, including insulators (e.g., rubber, plastics, and wood), when such materials are placed in a varying, high-frequency electromagnetic field. The heat results from electrical losses that occur in a material located between two metal plates or bars (e.g., electrodes) which form a type of capacitor connected to a radio-frequency oscillator. The metal plates or bars (e.g., electrodes) also serve to hold the materials together during heating and cooling. The electrical energy lost in the material is actually absorbed by it, causing its molecules to vibrate raising its kinetic energy or thermal energy. Unlike induction heating (i.e., preheated bars melting workpieces together), in which nonuniform heating may occur, dielectric heating makes it possible to heat an object evenly throughout thereby making a uniform weld. The degree to which this conversion of energy will occur is dependent on the atomic and molecular structure of the material and the frequency of the electromagnetic field.

The flashing portions to be welded may be made of various types of materials. In the preferred embodiment, the flashing portions are thermoplastic components, such as polyvinylchloride (PVC).

After the welder is moved, the body die portion is removed away from the base die portion and the finished welded flashing product comprised of the first and second flashing portions may be removed from the remaining die.

As discussed above, during the welding process, the welder often covers the top of the base die portion. Accordingly, a first indent 28 and a second indent 50 is placed at the first end of the body die portion to allow the first flashing portion to be folded away from the welding machine in either direction. Without these indents, the body die portion would have to be substantially the same size as the first flashing portion which is housed in the body die portion during welding. In other words, if the first flashing portion is a relatively long piece of flashing, the body die portion would also have to be a long die piece. Larger die pieces are more difficult to maneuver and are more expensive to manufacture. Accordingly, the present invention is comprised of a body die portion having at least one indent at the first end for allowing the flashing to be folded into the indent and away from the operational connection of the first end of the body die portion to the welder, e.g., welder is connected to surface edge 44 of the first end of the die body portion. In this way, the first flashing portion does not get in the way of the operational connection between the die body portion and the welder during welding.

In one embodiment, the body die portion is in a cylindrical or tubular shape. As discussed, the body die portion is adapted to house the first flashing portion during welding and wherein a top portion of the first flashing portion may be folded into said indent portion.

In one application of the invention, the first flashing portion is a tubular flashing and the second flashing portion is a base flashing portion. The tubular flashing is housed in the body die portion during welding. The base flashing portion is installed on the base die portion during welding. The tubular flashing portion is then welded to the base flashing portion to make a boot flashing for covering projections on a roof. Another base flashing portion may be welded to other end of the tubular flashing portion to make a drain or scupper flashing product 54. See FIGS. 4A–4B.

Figure 5:
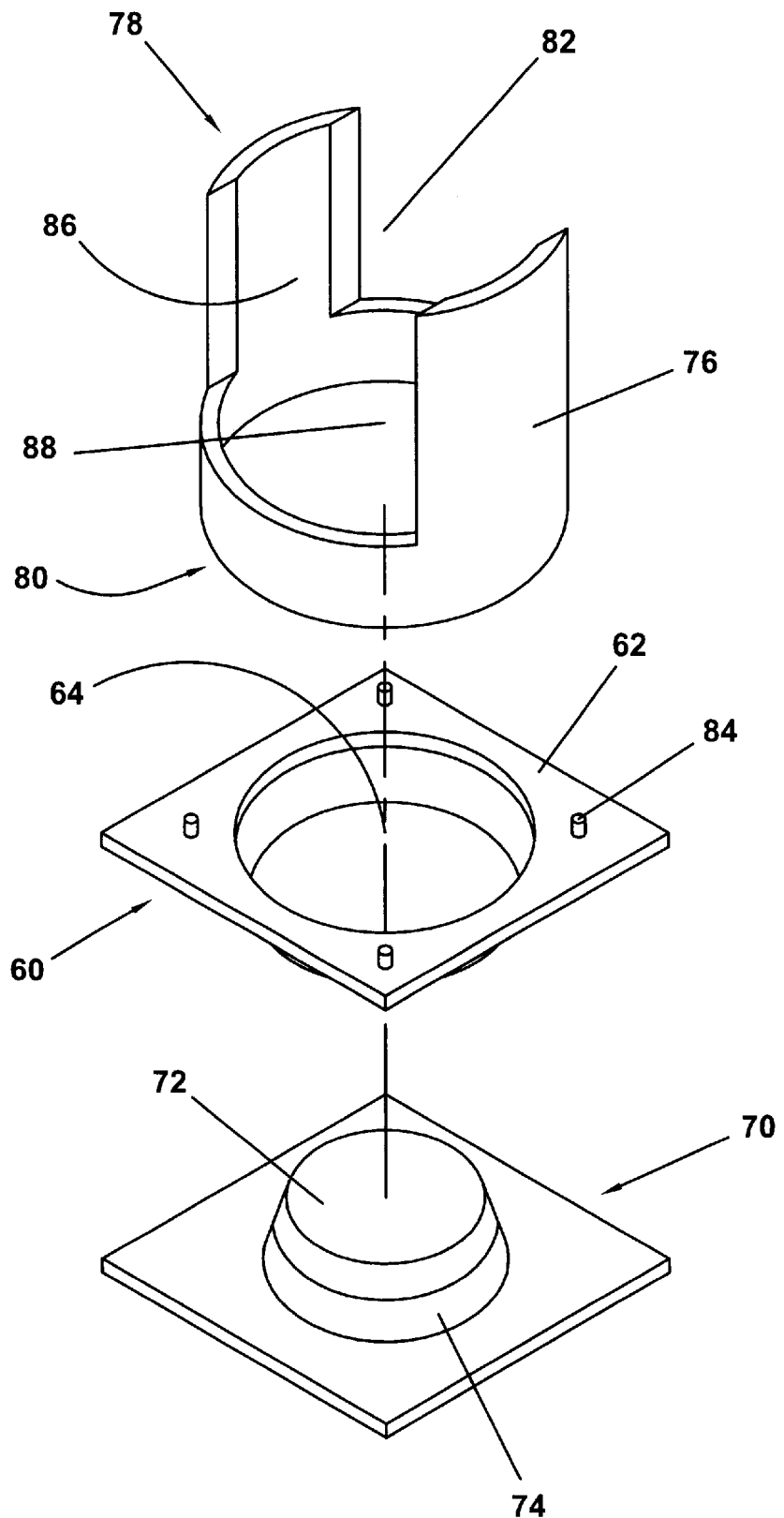
FIG. 5 illustrates an exploded view of a second embodiment of the die system of the present invention.
Figure 6A:
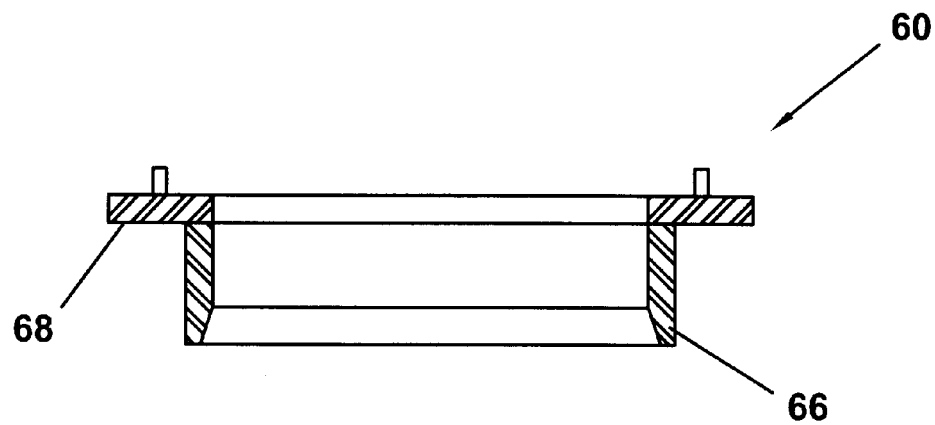
FIGS. 6A–6B illustrate views of one embodiment of a die plate of the present invention.
Figure 6B:
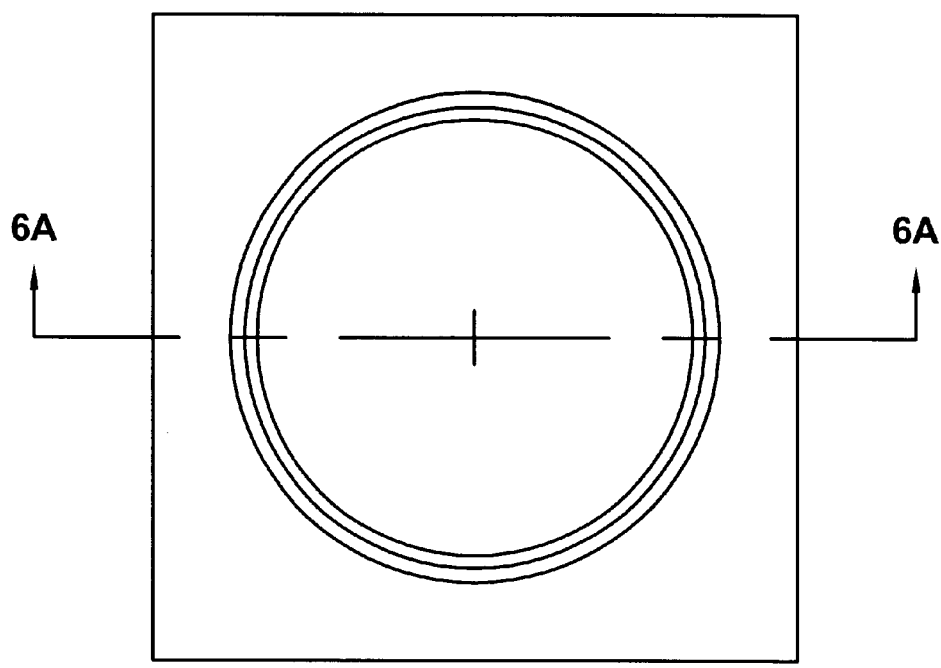
Figure 7:
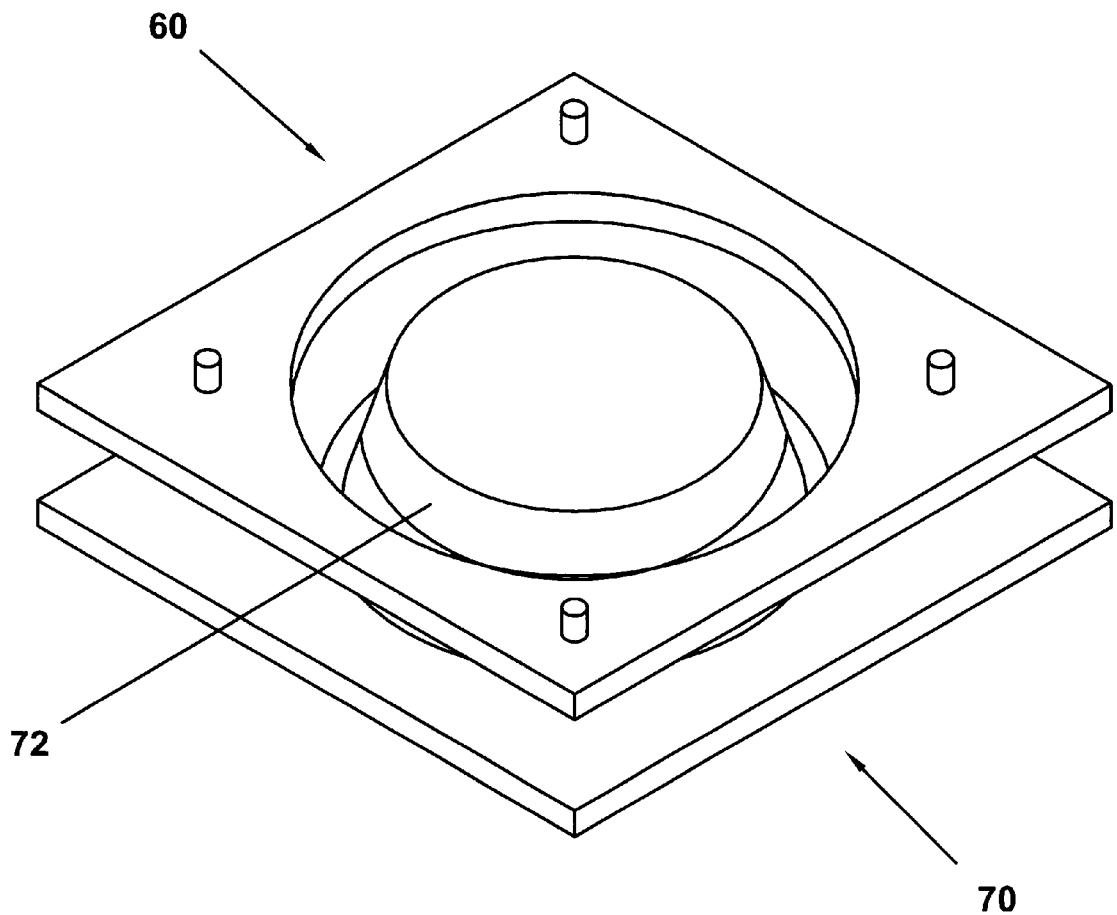
FIG. 7 illustrates one embodiment of a die plate mated with a base die portion of the present invention.
Figure 8:
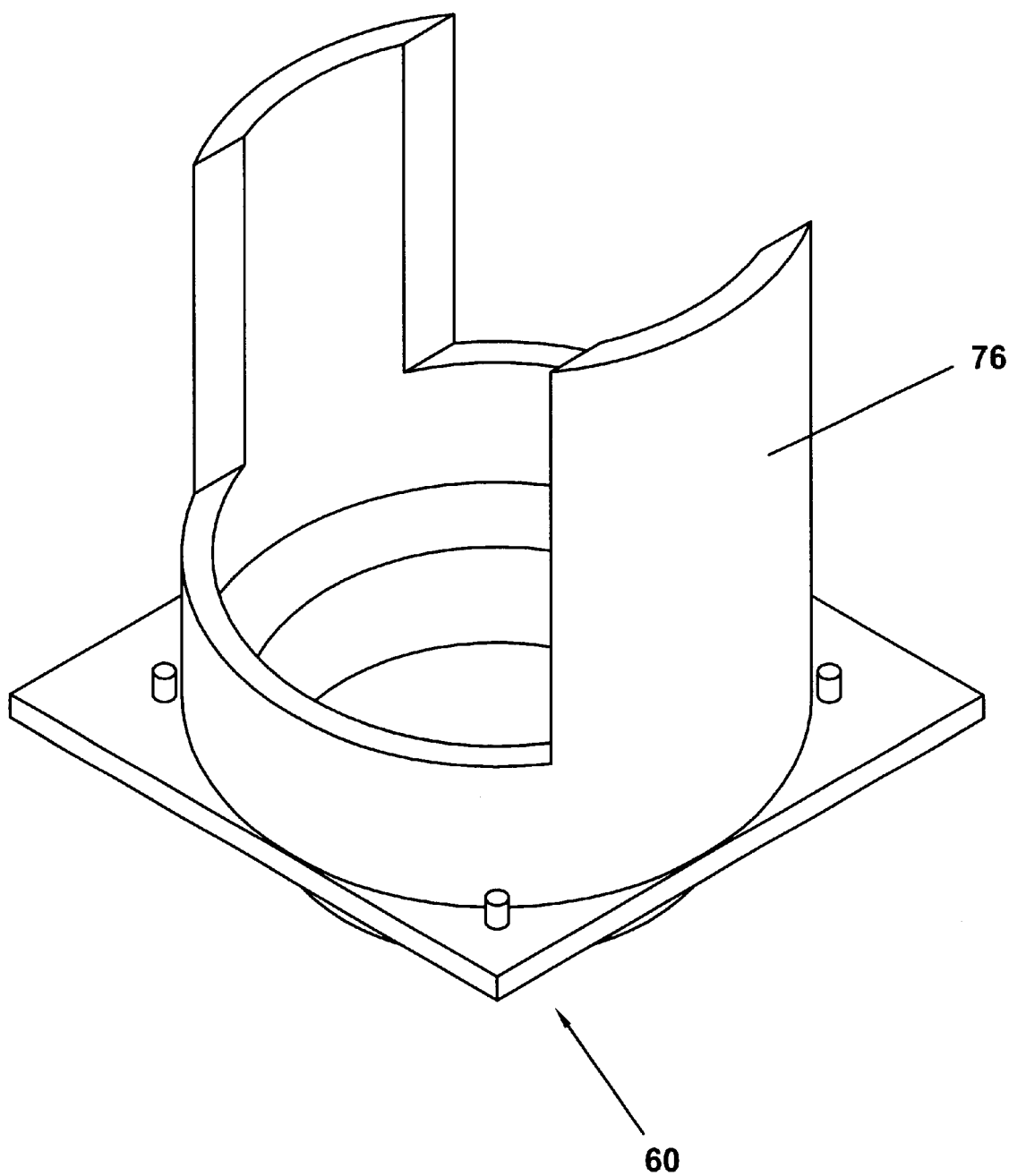
FIG. 8 illustrates one embodiment of body portion installed on a die plate of the present invention.
Figure 9:
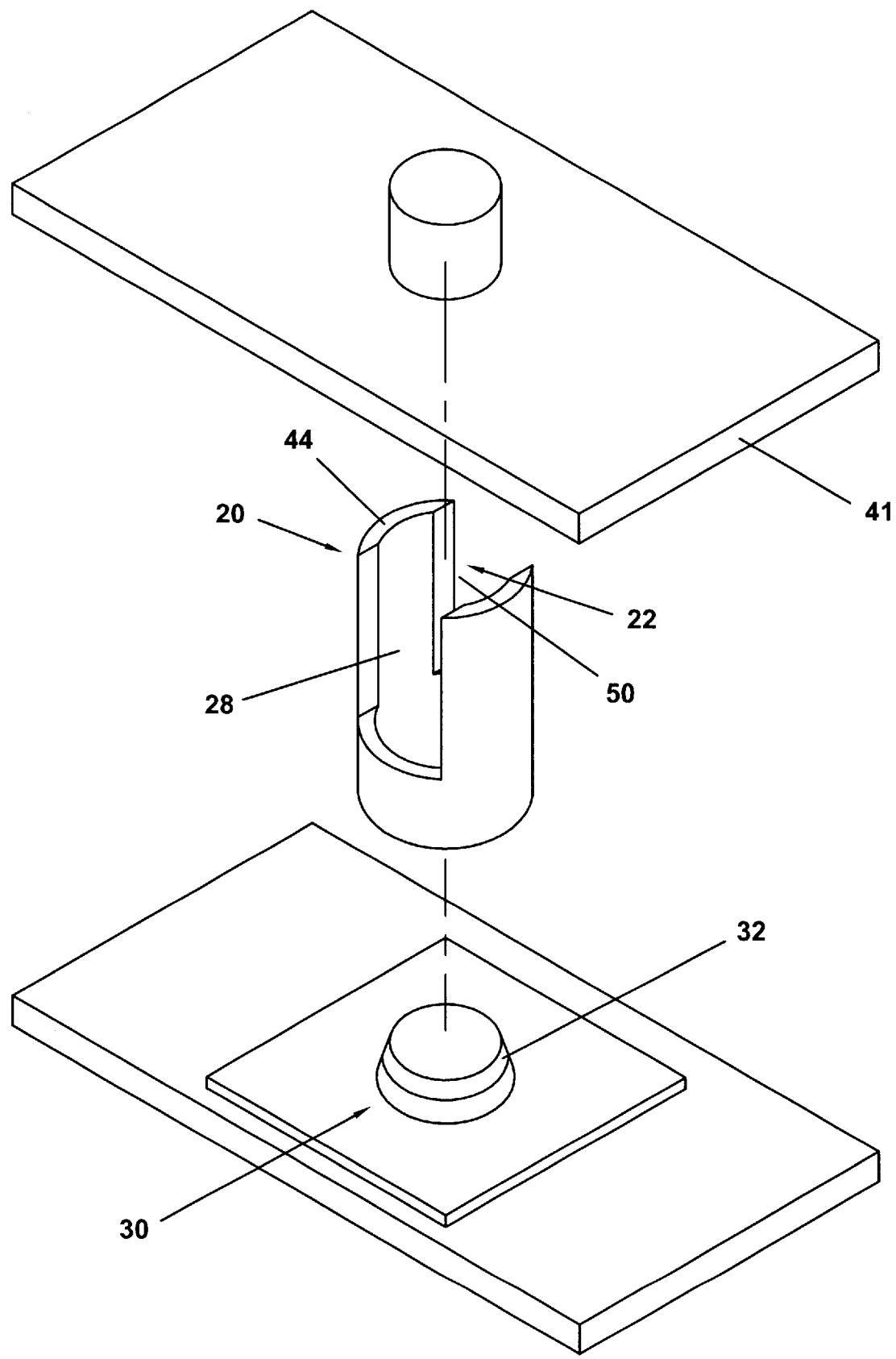
FIG. 9 illustrates one embodiment of a welder being applied to the die system of the present invention.

FIG. 5 illustrates an exploded view of a second embodiment of the die system of the present invention; FIG. 6A illustrates a cross-sectional view of one embodiment of a die plate of the present invention; FIG. 6B illustrates a bottom plan view of one embodiment of a die plate of the present invention; FIG. 7 illustrates one embodiment of a die plate mated with a base die portion of the present invention; and FIG. 8 illustrates one embodiment of a body portion of the die system installed on a die plate of the present invention. The body portion is preferably a conductive piece that is adapted to operationally connect to the welder.

The die system of the alternate embodiment is preferably comprised of: a first die portion 60 (in one embodiment a die plate as shown) having an upper surface 62 and an opening 64 in the upper surface; a flange portion 66 extending from a bottom surface 68 of the first die portion; and a second die portion 70 (in one embodiment a base die portion as shown), the flange portion of the first die portion adapted to be placed over the second die portion during welding, the second die portion adapted to hold the second flashing portion in a predetermined weld position. The second die portion may be a base die portion having a member 72 for holding a flashing portion. The member may be sloped or straight depending on the type of flashing required. It is preferred that a sloped member be used for a cylindrical type flashing.

The first and second die portions are sized so that the first flashing portion is held in place against the second flashing portion in a predetermined weld position when the flange portion of said first die portion is placed over said second die portion. In other words, the flat flashing portion, with the opening, is placed onto the second die portion 70. It is preferred that the edge of the opening in the flat flashing portion be held on the side 74 of the member. Another flashing portion, e.g., first flashing portion, for example in a tubular or cylindrical shape, is then placed over the member 70 and the flat flashing portion. The first die portion is then placed over the first flashing portion. The flange portion of the first die portion is correspondingly sized to the member 72 so that the flange portion presses the first flashing portion to the flat flashing portion, e.g., the second flashing portion.

The body portion 76 is then placed onto the surface of the first die portion. The body portion is preferably comprised of a conducting material. The body portion has a first end 78 a second end 80. The body portion also has an indent portion 82 at the first end of the body portion adapted to accept a portion of the flashing during welding.

The welder 41 is then operationally connected to the first end of said body portion and the second die portion. Using an RF welder, an electric field is established by the first and second die portion causing the first flashing portion to be welded to the second flashing portion.

In one embodiment, the first die portion has projectiles 84 placed on the upper surface of the first die portion around the opening in the first die portion for retaining the body portion on the first die portion. In another embodiment, a second indent portion 86 is place at the first end of said body portion located opposite to the indent portion 82.

In the preferred embodiment, the opening 88 in the second end of the body portion is larger in diameter than the opening in the upper surface of the first die portion. The opening 88 in the body portion is preferably larger because it allows the flashing to be more easily removed from the body portion after welding. The same body portion may be used with various first die portions having openings of various sizes for making different size flashings.

In one embodiment, the second flashing portion is a flat flashing membrane having an opening sized to fit over the second die portion. It is appreciated that various shapes of flashing may be used, with various size dies. For example, the second die portion may be in the shape of a cylinder, square, triangle, etc. In the preferred embodiment, the first flashing portion is a tubular or cylindrical flashing membrane having an opening corresponding to the opening in the second flashing portion.

Once the second flashing portion is installed on the second die portion, the first flashing portion is then positioned over the second flashing portion. The flange portion of the first die portion is then pressed onto the member of the second die portion to hold the first flashing portion to the second flashing portion.

Using an RF welder, operationally connected to the body portion and the second die portion, an electric field is established which causes heat at the connection point of the first and second flashing portions. This heat develops the weld between the first and second flashing portions.

In summary, the method of welding flashings using the alternate embodiment herein disclosed is preferably accomplished by the steps of:
providing a welder;
providing a first die portion having an upper surface and an opening in the upper surface, the first die portion further comprised of a flange portion extending from a bottom of the first die portion;
providing a second die portion, the flange portion of the first die portion adapted to be placed over the second die portion during welding;
providing a first flashing portion;
providing a second flashing portion having an opening;
placing the opening of the second flashing portion on the second die portion;
placing the first flashing portion on the second flashing portion in a predetermined weld position;
placing the flange portion of the first die portion over the first flashing portion and the second flashing portion to hold the first flashing portion against the second flashing portion; and
welding the first flashing portion to the second flashing portion.

The method may also comprise the further steps of:
providing a body portion comprised of a conducting material, the body portion having a first end and a second end;
placing an indent portion at the first end of said body portion adapted to accept a portion of the flashing during welding; and
placing the body portion on the upper surface of the first die portion during welding.

The welder is then operationally connected to the first end of said body portion and the second die portion and a portion of the first flashing portion is folded away from the operational connection between the first end of the body portion and the welder. This allows the first flashing portion, e.g., a tubular section, to be folded away from the welder during the welding process.

Figure 10:
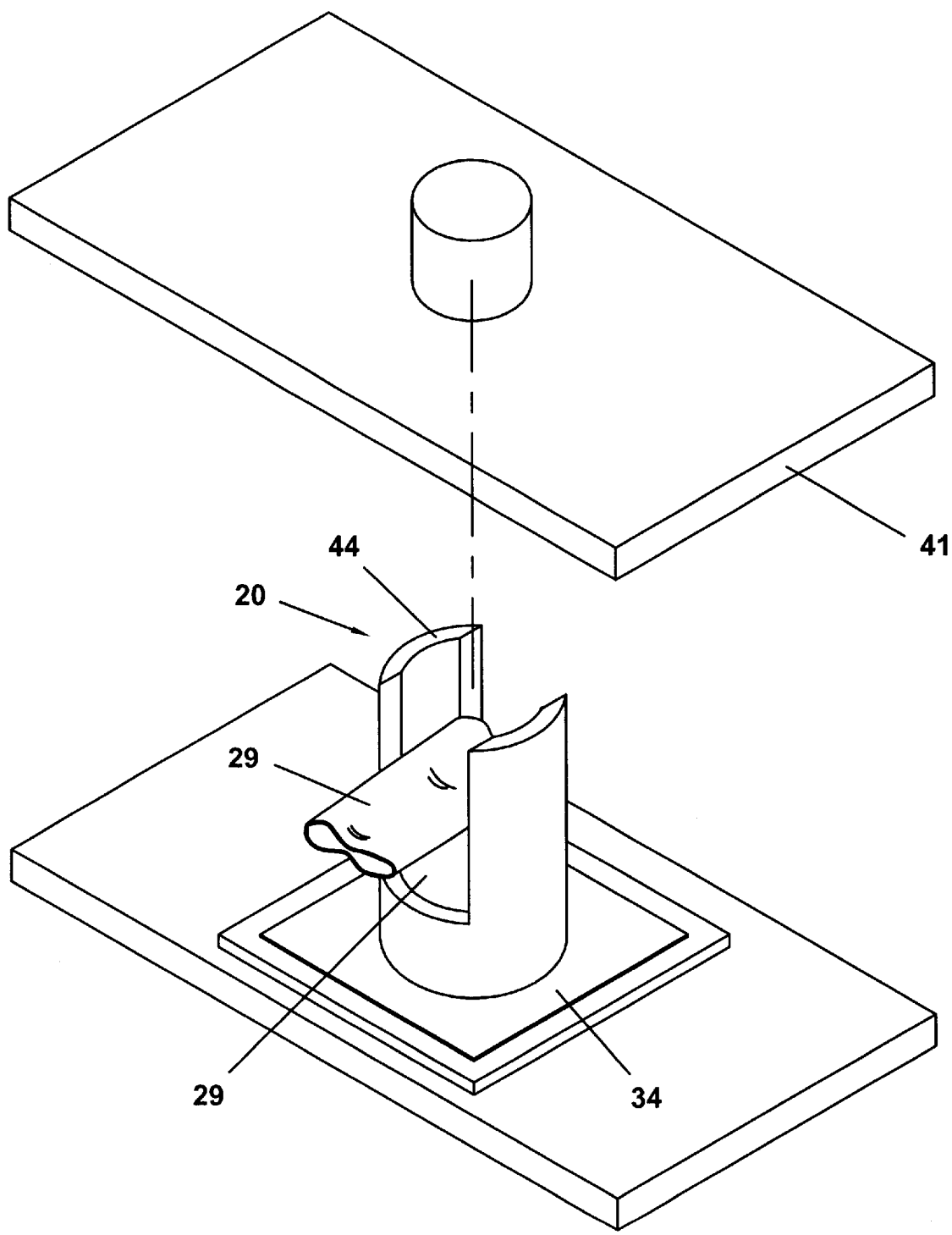
FIG. 10 illustrates an example of the present invention in use showing a flashing folded into an indent portion.
Figure 11:
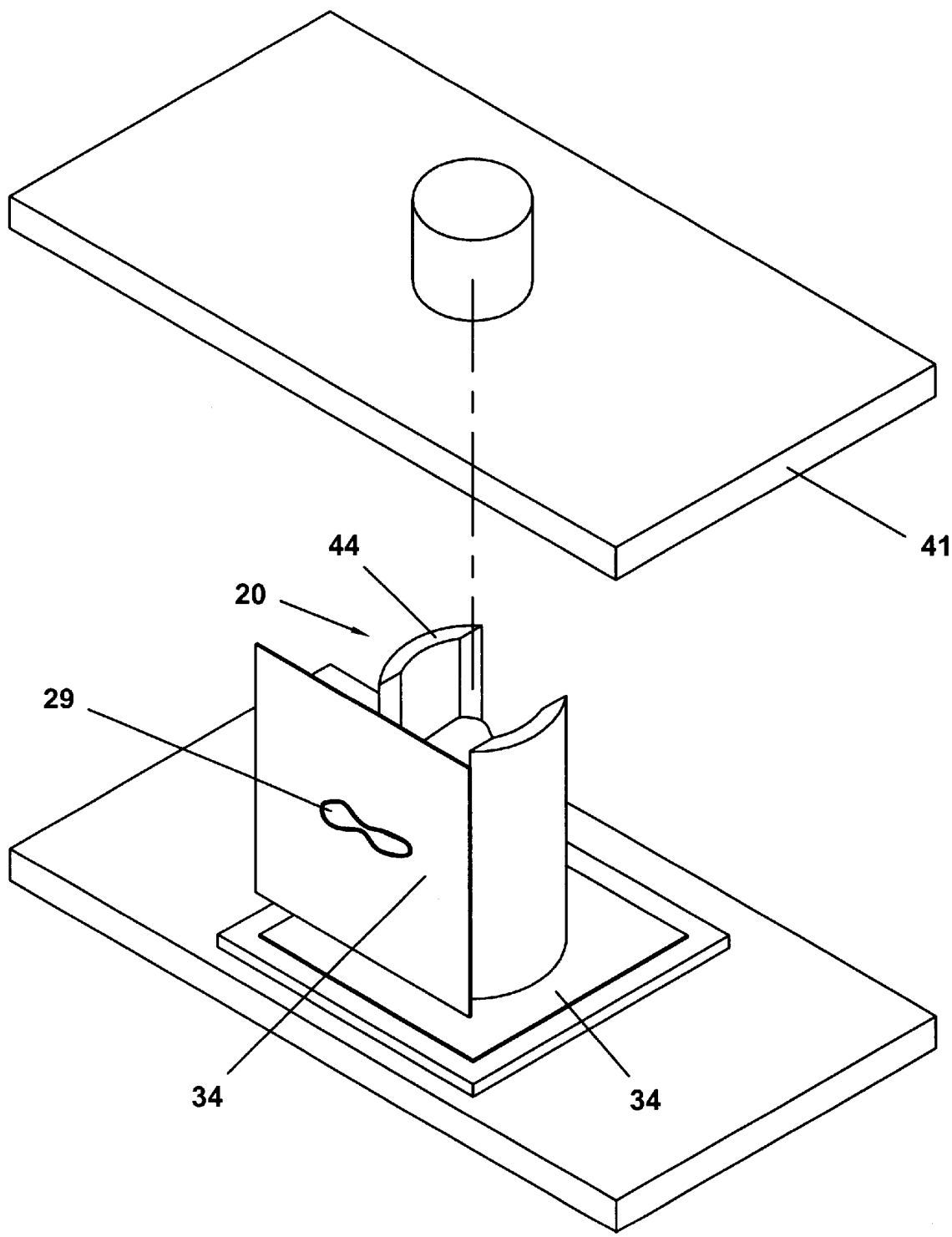
FIG. 11 illustrates an example illustrating another flashing folded into an indent portion.

FIG. 10 illustrates an example of the present invention in use showing a flashing folded into an indent portion, and FIG. 11 illustrates an example illustrating another flashing folded into an indent portion After welding the first flashing portion to the second flashing portion, the welder and body portion are removed away from the flashing. The finished flashing product is then pulled off the second die portion and pulled through the first die portion.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A die system for use in formation of a welded flashing by heat welding a first flashing portion to a second flashing portion, comprising:
a first die portion having an upper surface and an opening in said upper surface, said first die portion further comprised of a flange portion extending from a bottom surface of said first die portion;
a second die portion, said flange portion of said first die portion adapted to be placed over said second die portion during welding, said second die portion adapted to hold the second flashing portion in a predetermined weld position;
wherein said first and second die portions are sized so that the first flashing portion is held in place against the second flashing portion in a predetermined weld position when said flange portion of said first die portion is placed over said second die portion.

2. A die system according to claim 1, further comprising:
a body portion comprised of a conducting material, said body portion having a first end and a second end;
an indent portion at said first end of said body portion adapted to accept a portion of the flashing during welding;
wherein said body portion is adapted to be placed on said upper surface of said first die portion; and wherein the portion of the flashing accepted in the indent portion of said body portion is folded away from an operational connection between said first end of said body portion and a welder.

3. A die system according to claim 2, wherein the welder is operationally connected to said first end of said body portion and said second die portion, and wherein an electric field established by said first and second die portion causes the first and second flashing portions to be welded.

4. A die system according to claim 2, further comprising:
at least three projectiles placed on said upper surface of said first die portion around said opening in said first die portion for retaining said body portion on said first die portion.

5. A die system according to claim 4, further comprising:
a second indent portion at said first end of said body portion located opposite to said indent portion, said second indent portion adapted to accept a portion of the flashing during welding.

6. A die system according to claim 2, wherein an opening in said second end of said body portion is larger in diameter than said opening in said upper surface of said first die portion.

7. A die system according to claim 1, wherein an inner surface of said flange portion of said first die portion is sloped.

8. A die system according to claim 7, wherein said second die portion is configured with a sloped exterior surface corresponding to the sloped inner surface of said flange portion.

9. A die system according to claim 1, wherein the second flashing portion is a flat flashing membrane having an opening sized to fit over said second die portion;
wherein the first flashing portion is a tubular or cylindrical flashing membrane having an opening corresponding to the opening in said flat flashing membrane.

10. A die system according to claim 9, wherein the second flashing portion is placed over said second die portion so that the first flashing portion may be placed over the second flashing portion and welded to the second flashing portion along an edge of the opening in the second flashing portion.

11. A die system according to claim 10, wherein said flange portion of said first die portion is adapted to be placed over said second die portion with the second flashing portion installed to hold the first flashing portion to the second flashing portion along the edge of the opening in the second flashing portion.

12. A method for heat welding a flashing using an open die system, comprising the steps of:
providing a welder;
providing a first die portion having an upper surface and an opening in said upper surface, said first die portion further comprised of a flange portion extending from a bottom of said first die portion;
providing a second die portion, said flange portion of said first die portion adapted to be placed over said second die portion during welding;
providing a first flashing portion;
providing a second flashing portion having an opening;
placing the opening of the second flashing portion over said second die portion;
placing the first flashing portion over the second flashing portion in a predetermined weld position;
placing said flange portion of said first die portion over the first flashing portion and the second flashing portion to hold the first flashing portion against the second flashing portion; and
welding the first flashing portion to the second flashing portion.

13. The method of claim 12, further comprising the step of:
providing a body portion comprised of a conducting material, said body portion having a first end and a second end;
placing an indent portion at said first end of said body portion adapted to accept a portion of the flashing during welding; and
placing said body portion on said upper surface of said first die portion during welding.

14. The method of claim 13, further comprising the step of:
operationally connecting said first end of said body portion to the welder;
folding a portion of the first flashing portion into said indent portion away from the operational connection between said first end of said body portion and the welder.

* * * * *